United States Patent
Kim et al.

(10) Patent No.: US 11,211,649 B2
(45) Date of Patent: Dec. 28, 2021

(54) BATTERY MODULE

(71) Applicant: Samsung SDI Co., Ltd., Yongin-si (KR)

(72) Inventors: Hyun Kim, Yongin-si (KR); Janggun Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/488,916

(22) PCT Filed: Feb. 1, 2018

(86) PCT No.: PCT/KR2018/001405
§ 371 (c)(1),
(2) Date: Aug. 26, 2019

(87) PCT Pub. No.: WO2018/182162
PCT Pub. Date: Oct. 4, 2018

(65) Prior Publication Data
US 2020/0036061 A1 Jan. 30, 2020

(30) Foreign Application Priority Data
Mar. 30, 2017 (KR) ........................ 10-2017-0040790

(51) Int. Cl.
*H01M 10/613* (2014.01)
*H01M 50/20* (2021.01)
(52) U.S. Cl.
CPC ......... *H01M 10/613* (2015.04); *H01M 50/20* (2021.01)

(58) Field of Classification Search
CPC ........ H01M 10/6556; H01M 10/6557; H01M 10/6568; H01M 10/5038; H01M 2/08;
(Continued)

(56) References Cited

U.S. PATENT DOCUMENTS 8,067,111 B2 11/2011 Koetting et al.
8,426,050 B2 4/2013 Koetting et al.
(Continued)

FOREIGN PATENT DOCUMENTS

DE 10 2011 107 075 A1 3/2012
EP 2 696 433 A1 2/2014
(Continued)

OTHER PUBLICATIONS

Machine Translation of Shin et al. KR 20140007029 A (Year: 2014).*

(Continued)

*Primary Examiner* — Maria Laios
*Assistant Examiner* — Grace Ann Kenlaw
(74) *Attorney, Agent, or Firm* — Lewis Roca Rothgerber Christie LLP

(57) ABSTRACT

A battery module includes a cooling plate including a housing, a first manifold coupled to one end of the housing, and a second manifold coupled to another end of the housing; and at least one battery pack arranged on the cooling plate, wherein the housing includes therein a plurality of flow paths and a plurality of hollows passing through the housing from the one end to the other end, and the plurality of flow paths and the plurality of hollows are arranged alternately and in parallel to each other.

16 Claims, 6 Drawing Sheets

(58) Field of Classification Search
CPC .. H01M 6/5038; H01M 10/06; H01M 10/613; F28F 11/00
See application file for complete search history.

(56) References Cited

U.S. PATENT DOCUMENTS

| | | | |
|---|---|---|---|
| 9,799,862 B2 | 10/2017 | Kwag et al. | |
| 2011/0132580 A1* | 6/2011 | Herrmann | F28D 1/0478 165/104.33 |
| 2012/0315529 A1* | 12/2012 | Jin | H01M 10/6556 429/120 |
| 2015/0064543 A1 | 3/2015 | Jung | |
| 2015/0093613 A1* | 4/2015 | Obasih | H01M 10/6555 429/82 |

FOREIGN PATENT DOCUMENTS

| | | | | |
|---|---|---|---|---|
| JP | 2014-192091 | A | | 10/2014 |
| KR | 10-2010-0047101 | A | | 5/2010 |
| KR | 10-1069161 | | | 9/2011 |
| KR | 10-1145732 | B1 | | 5/2012 |
| KR | 10-2014-0007029 | A | | 1/2014 |
| KR | 20140007029 | A | | 1/2014 |
| KR | 20140007029 | A | * | 1/2014 |
| KR | 10-1367212 | B1 | | 3/2014 |
| KR | 101367212 | B1 | | 3/2014 |
| KR | 10-2015-0024999 | A | | 3/2015 |
| KR | 10-2015-0111757 | A | | 10/2015 |
| KR | 10-2015-0122517 | A | | 11/2015 |
| KR | 10-2016-0024187 | A | | 3/2016 |
| KR | 101750029 | B1 | * | 6/2017 .......... H01M 10/625 |
| WO | WO2018155755 | A1 | | 8/2018 |

OTHER PUBLICATIONS

Machine Translation Kim et al. KR 101750029B1 (Year: 2017).*
International Search Report for International Application No. PCT/KR2018/001405, dated May 4, 2018, including English translation 5pp.
Extended European Search Report dated Dec. 18, 2020 issued in corresponding European Application No. 18774223.4, 8 pages.
Korean Office action dated Mar. 19, 2021 issued in corresponding KR Pat. Application No. 2017-40790, 5 pages.
Office action issued by European Patent Office dated Jul. 5, 2021 issued in corresponding EPC Patent Application No. 18 774 223.4-1108, 4 pages.
Korean Office action dated Sep. 15, 2021 issued in corresponding KR Application No. 10-2017-0040790, 4 pages.

* cited by examiner

BATTERY MODULE

CROSS-REFERENCE TO RELATED APPLICATION(S)

This application is a National Phase Patent Application of International Patent Application Number PCT/KR2018/001405, filed on Feb. 1, 2018, which claims priority of Korean Patent Application No. 10-2017-0040790, filed Mar. 30, 2017. The entire contents of both of which are incorporated herein by reference.

TECHNICAL HELD

The present disclosure relates to a battery module, and more particularly, to a battery module including a cooling plate.

BACKGROUND ART

A battery pack with a plurality of battery cells installed therein has been used in various industrial fields. Particularly, in recent years, as hybrid vehicles and electric vehicles have been actively developed, battery packs have been widely used as energy sources of power devices of vehicles.

DESCRIPTION OF EMBODIMENTS

Technical Problem

Meanwhile, when a battery pack operates, battery cells therein generate heat, and when the battery cells are exposed to high temperature for a long time due to such heat generation, the performance and lifetime of the battery pack may degrade.

Solution to Problem

Provided is a battery module including a cooling plate capable of cooling a battery pack.

According to an aspect of the present disclosure, a battery module includes: a cooling plate including a housing, a first manifold coupled to one end of the housing, and a second manifold coupled to another end of the housing; and at least one battery pack arranged on the cooling plate, wherein the housing includes therein a plurality of flow paths and a plurality of hollows passing through the housing from the one end to the other end, and the plurality of flow paths and the plurality of hollows are arranged alternately and in parallel to each other.

Advantageous Effects of Disclosure

According to embodiments of the present disclosure, the weight of the cooling plate for cooling the battery pack may be reduced, and the cooling efficiency of the battery pack may be improved. However, the scope of the present disclosure is not limited to these effects.

BEST MODE

Figure 1:
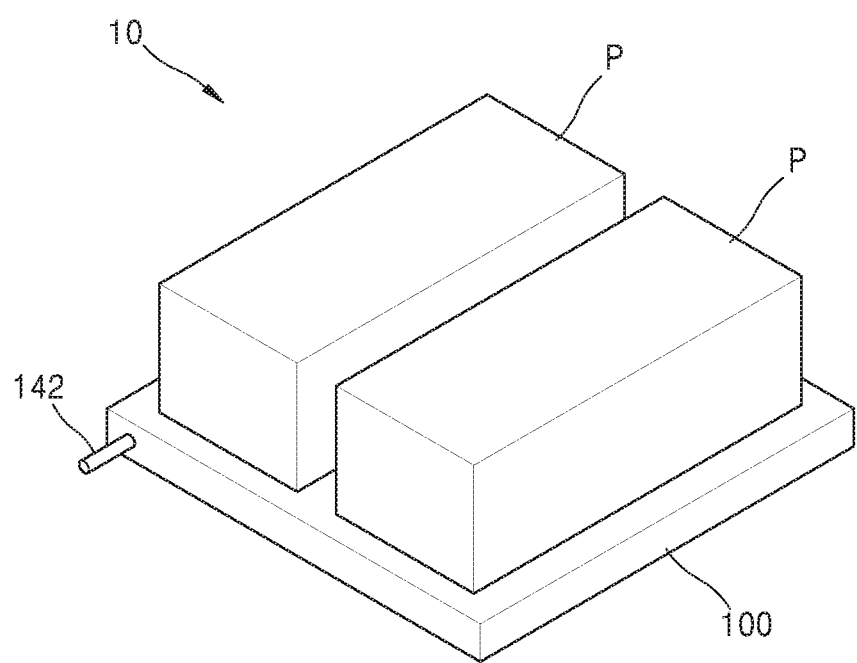
FIG. 1 is a perspective view schematically illustrating a battery module according to an embodiment of the present disclosure.

According to an aspect of the present disclosure, a battery module includes: a cooling plate including a housing, a first manifold coupled to one end of the housing, and a second manifold coupled to another end of the housing; and at least one battery pack arranged on the cooling plate, wherein the housing includes therein a plurality of flow paths and a plurality of hollows passing through the housing from the one end to the other end, and the plurality of flow paths and the plurality of hollows are arranged alternately and in parallel to each other.

Herein, the cooling plate may further include a spacer arranged between the one end and the first manifold and between the other end and the second manifold and sealing the plurality of hollows.

The spacer may include a plate arranged on the one end or the other end and a plurality of blocks protruding from the plate, and the plurality of blocks may be inserted into the plurality of hollows to seal the plurality of hollows.

The plate may include a plurality of first holes at positions corresponding to the plurality of flow paths.

The first manifold may include a coolant inlet on one side thereof, and a size of the plurality of first holes may decrease toward the coolant inlet.

Each of the plurality of blocks may include an empty space therein, and the plate may further include a second hole connected to the empty space.

The first manifold may overlap with an edge of one end portion of the housing, and the first manifold and the edge of the one end portion of the housing overlapping with each other may be joined together.

The first manifold may include a stopper protruding vertically from an inner surface thereof in an inward direction of the first manifold, and the stopper may contact an edge of the plate.

The first manifold may have a shape of a cuboid and include a first guide protruding inward from at least one of two main side surfaces with a wider area among side surfaces of the cuboid.

The first manifold may include a coolant inlet on one side thereof, and a height of the first guide may decrease away from the coolant inlet.

The second manifold may have a shape of a cuboid and include a second guide protruding inward from at least one of two main side surfaces with a wider area among side surfaces of the cuboid.

The second manifold may further include a coolant outlet at a diagonal position with respect to the coolant inlet, and a height of the second guide may increase away from the coolant outlet.

A cross-section of each of the plurality of flow paths may have a shape of a tetragon, and a length of a lower side of the tetragon may be less than or equal to about three times a length of an upper side of the tetragon adjacent to the battery pack.

The length of the lower side may be less than or equal to the length of the upper side.

A cross-section of each of the plurality of flow paths may have a shape of an inverted triangle with a bottom side adjacent to the battery pack.

These and/or other aspects, features, and advantages will become apparent from the accompanying drawings, the appended claims, and the following detailed description of the present disclosure.

MODE OF DISCLOSURE

The present disclosure may include various embodiments and modifications, and certain embodiments thereof are illustrated in the drawings and will be described herein in detail. However, it will be understood that the present disclosure is not limited to the embodiments and includes all modifications, equivalents, and substitutions falling within the spirit and scope of the present disclosure. In the following description of the present disclosure, certain detailed descriptions of the related art will be omitted when it is deemed that they may unnecessarily obscure the subject matters of the present disclosure.

Although terms such as "first" and "second" may be used herein to describe various elements or components, these elements or components should not be limited by these terms. These terms are only used to distinguish one element or component from another element or component.

The terminology used herein is for the purpose of describing particular embodiments only and is not intended to limit the present disclosure. As used herein, the singular forms "a", "an", and "the" are intended to include the plural forms as well, unless the context clearly indicates otherwise. Also, in the drawings, components are exaggerated, omitted, or schematically illustrated for clarity and convenience of description, and the size of each component may not entirely reflect the actual size.

In the description of each component, in the case where a component is described as being formed "on" or "under" another component, the component may be formed directly "on" or "under" the other component or may be formed indirectly "on" or "under" the other component with one or more other components therebetween, and references to "on" and "under" will be described based on the drawings.

Hereinafter, embodiments of the present disclosure will be described in detail with reference to the accompanying drawings, and in the following description, like reference numerals will be used to denote like elements and redundant descriptions thereof will be omitted for conciseness.

Figure 2:
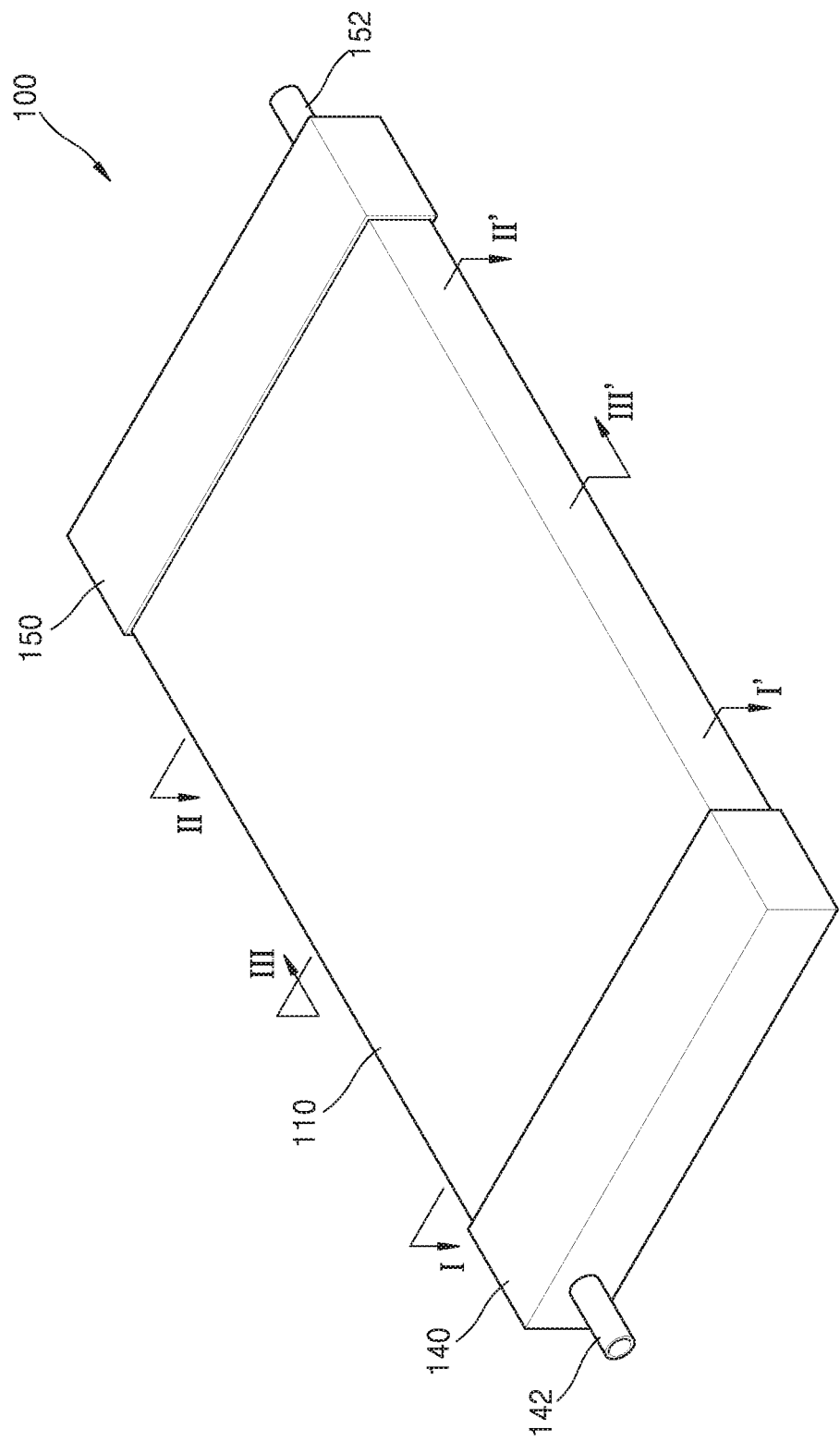
FIG. 2 is a perspective view schematically illustrating a cooling plate of the battery module of FIG. 1.
Figure 3:
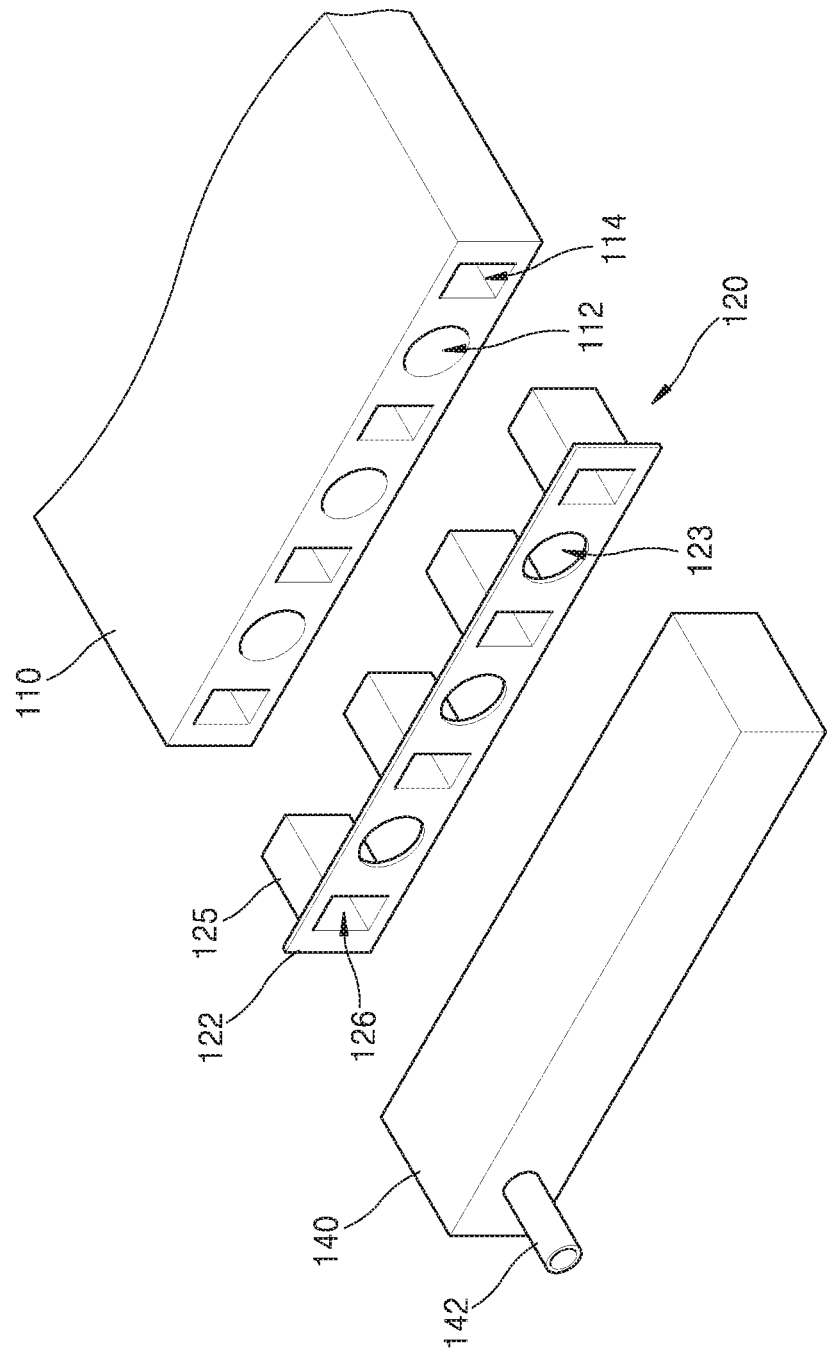
FIG. 3 is an exploded perspective view schematically illustrating a portion of the cooling plate of FIG. 2.
Figure 4:
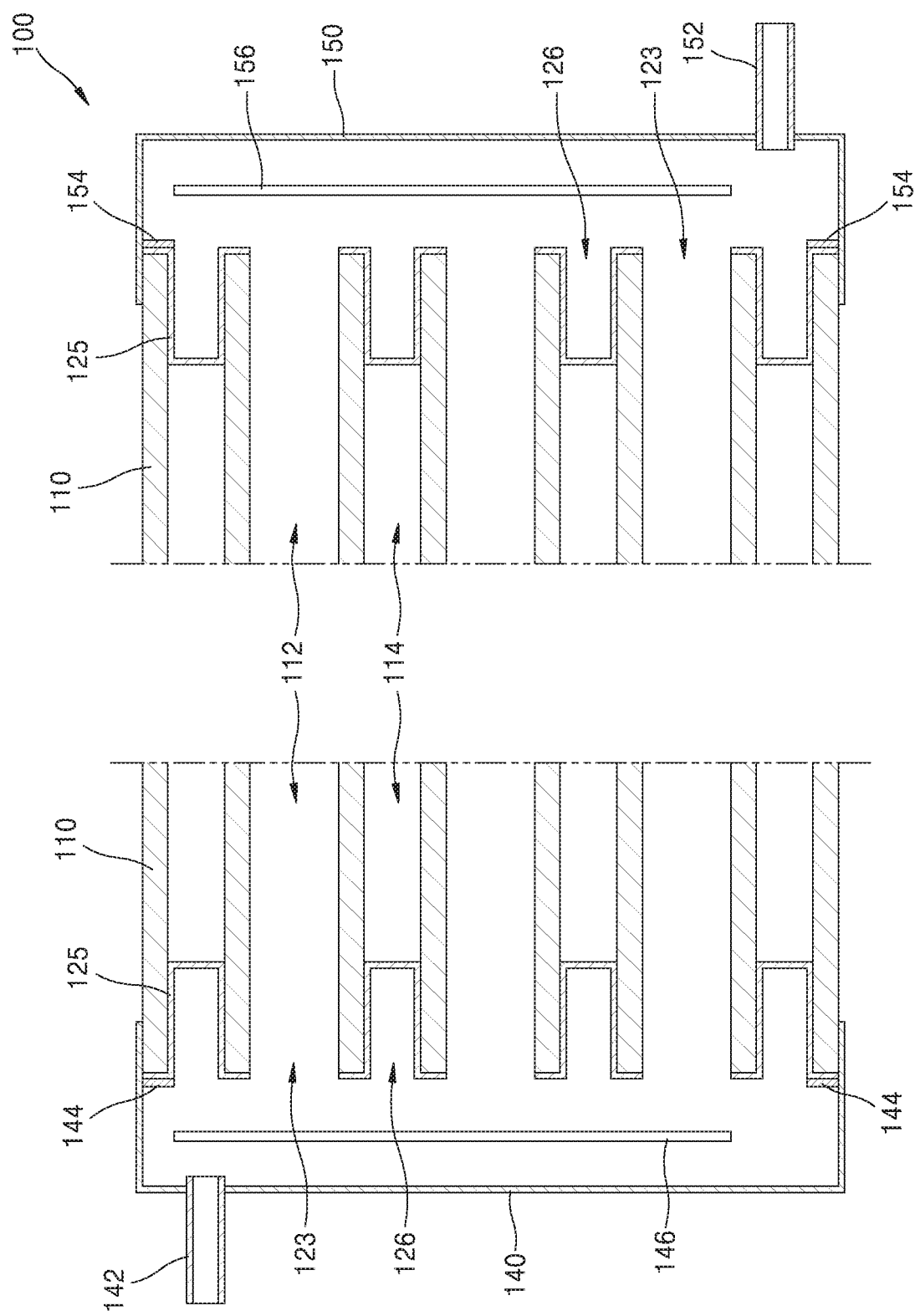
FIG. 4 is a cross-sectional view schematically illustrating an example of a I-I' cross section and an II-II' cross section in FIG. 2.

FIG. 1 is a perspective view schematically illustrating a battery module according to an embodiment of the present disclosure, FIG. 2 is a perspective view schematically illustrating a cooling plate of the battery module of FIG. 1, FIG. 3 is an exploded perspective view schematically illustrating a portion of the cooling plate of FIG. 2, and FIG. 4 is a cross-sectional view schematically illustrating an example of a I-I' cross-section and a II-II' cross-section in FIG. 2.

Referring to FIGS. 1 to 4, a battery module 10 according to an embodiment of the present disclosure may include a battery pack P and a cooling plate 100 for cooling the battery pack P.

The battery pack P may include a plurality of battery cells. Each of the plurality of battery cells may be a secondary battery that is rechargeable. Each of the plurality of battery cells may include an electrode assembly therein. The electrode assembly may include a first electrode plate and a second electrode plate that are coated with electrode active material and have different polarities, and a separator therebetween. As an example, the electrode assembly may be manufactured by sequentially stacking a first electrode plate, a separator, and a second electrode plate and then winding the resulting structure into a jellyroll form, and as another example, the electrode assembly may be a stack structure in which a first electrode plate, a separator, and a second electrode plate are sequentially stacked. For example, each of the plurality of battery cells may be a lithium ion secondary battery, but is not limited thereto.

The battery pack P may be located on the cooling plate 100 to be cooled by the cooling plate 100. Meanwhile, a plurality of battery packs P may be located on the cooling plate 100. For example, FIG. 1 illustrates that two battery packs P are located on the cooling plate 100; however, the present disclosure is not limited thereto.

The cooling plate 100 may include a housing 110; a first manifold 140 and a second manifold 150 that are respectively coupled to both end portions of the housing 110; and a pair of spacers 120 that are respectively arranged between the housing 110 and the first manifold 140 and between the housing 110 and the second manifold 150.

The housing 110 may be formed of a material having an excellent mechanical strength and heat transmission rate and may include a plurality of flow paths 112 and a plurality of hollows 114 therein. For example, the housing 110 may be formed of a material such as SUS, steel, or aluminum.

The plurality of flow paths 112 and the plurality of hollows 114 may be arranged alternately and in parallel to each other in the housing 110, and may be formed to pass through the housing 110 from one end to the other end of the housing 110 where the pair of spacers 120 are respectively arranged. Meanwhile, partitions may be formed between the plurality of flow paths 112 and the plurality of hollows 114, thereby preventing the cooling plate 100 from being deformed by the weight of the battery pack P located on the cooling plate 100.

The plurality of flow paths 112 may be a path through which a coolant flows and the plurality of hollows 114 may be sealed to block the inflow of a coolant and thus the weight of the housing 110 may be reduced. In an alternative embodiment, the plurality of hollows 114 may be filled with a heat transmission medium and the heat transmission medium may transmit the heat generated in the battery pack P to the coolant flowing through the plurality of flow paths 112 and thus the cooling efficiency of the cooling plate 100 may be improved.

The spacer 120 may be coupled to each of both end portions of the housing 110 to seal the plurality of hollows 114 to prevent the coolant from flowing into the hollows 114 and to control the coolant inflow rate into the plurality of flow paths 112. The spacer 120 may be formed of a material such as SUS, steel, aluminum, or plastic.

The spacer 120 may include a plate 122 located at each of both end portions of the housing 110 and a plurality of blocks 125 projecting from the plate 122. The plurality of blocks 125 may respectively have cross-sections of the same shapes as the plurality of hollows 114 corresponding thereto, and may be respectively inserted into the plurality of hollows 114. Accordingly, the plurality of hollows 114 may be sealed and the spacers 120 may be stably coupled to both end portions of the housing 110.

Meanwhile, the plate 122 may include a plurality of first holes 123 at positions corresponding to the plurality of flow paths 112. The plurality of first holes 123 may be formed to pass through the plate 122 in the thickness direction of the plate 122 and may control the coolant inflow rate into the plurality of flow paths 112. For example, the size of the first hole 123 may decrease toward a coolant inlet 142 of the first manifold 140. Thus, by compensating for the decrease in the coolant inflow rate away from the coolant inlet 142, the coolant may be uniformly distributed to the plurality of flow paths 112.

Also, the plate 122 may further include a plurality of second holes 126 at positions corresponding to the plurality of blocks 125. Each of the plurality of blocks 125 may be in the form of a box having an internal empty space and an external shape for coupling with the hollow 114 by insertion into the hollow 114, thereby preventing an increase in the weight of the cooling plate 100. Meanwhile, the second hole 126 may be connected to an internal space of the block 125 to draw the coolant flowing in from the coolant inlet 142 into an internal empty space of the block 125 to generate a vortex of the coolant, thereby preventing the coolant from being concentrated on the flow path 112 close to the coolant inlet 142.

The spacers 120 may be located on one end portion and the other end portion of the housing 110 and may be coupled to the housing 110 by inserting the plurality of blocks 125 into the plurality of hollows 114. Also, silicone, adhesive, or the like may be applied between the spacer 120 and the housing 110 to improve the adhesion between the spacer 120 and the housing 110 and seal the plurality of hollows 114. For example, silicone, adhesive, or the like may be applied onto an outer surface of the block 125 and a surface of the plate 122 where the block 125 is located.

The first manifold 140 coupled to one end of the housing 110 may include, on one side thereof, a coolant inlet 142 for introducing the coolant and may include, therein, a structure functioning as a pipe for uniform distribution of the coolant.

The first manifold 140 may be formed of a material such as SUS, steel, or aluminum and may be formed to cover an edge of one end portion of the housing 110. That is, the first manifold 140 may overlap with the edge of one end portion of the housing 110, and the overlapping portions may be welded to couple the first manifold and the housing 110 together. Also, a sealing member such as silicone may be applied onto the overlapping region of the first manifold 140 and the housing 110 to prevent the leakage of the coolant.

The first manifold 140 may include a first stopper 144 for setting a coupling position with the housing 110. The first stopper 144 may protrude vertically from the inner surface of the first manifold 140 in the inward direction of the first manifold 140 and thus may be joined to the edge of the plate 122 when the first manifold 140 and the housing 110 are coupled together. For example, the first stopper 144 may be formed over the entire inner surface of the first manifold 140 to contact the entire edge of the plate 122.

Meanwhile, the first manifold 140 may further include a first guide 146 therein. For example, when the first manifold 140 has the shape of a cuboid, the first guide 146 may be a protrusion portion formed on at least one of two main side surfaces with the wider area among the side surfaces of the first manifold 140. That is, the first guide 146 may be formed to protrude from at least one main side surface of the first manifold 140, and in this case, the height of the first guide 146 may decrease away from the coolant inlet 142. Thus, by introducing the inflow of the coolant into the flow path 112 remote from the coolant inlet 142, the coolant may be uniformly distributed to the plurality of flow paths 112. Meanwhile, when a structure for uniform distribution of the coolant is formed in the first manifold 140, the first guide 146 may be spaced apart from the structure and may be located between the coolant inlet 142 and the structure.

The second manifold 150 may include a coolant outlet 152 on one side thereof and may be coupled to the other end of the housing 110. The coolant outlet 152 may be located at a diagonal position with respect to the coolant inlet 142.

The second manifold 150 may be coupled to the housing 110 in the same way as the first manifold 140. That is, the second manifold 150 may be coupled to the housing 110 to cover the spacer 120 covering the other end of the housing 110 and the edge of the other end of the housing 110, and the second manifold 150 and the edge of the other end portion of the housing 110 overlapping with each other may be welded together.

Also, the second manifold 150 may include a second stopper 154 for setting a coupling position with the housing 110 and may further include a second guide 156 for uniform distribution of the coolant. Similar to the first guide 146, the second guide 156 may be formed to protrude from at least one of two main side surfaces of the second manifold 150. In this case, the height of the second guide 156 may increase away from the coolant outlet 152. Accordingly, by applying a relatively large resistance to the flow of the coolant passing through the flow path 112 at a position close to the coolant inlet 142, it may be possible to prevent the coolant from being excessively introduced into the flow path 112 at the position close to the coolant inlet 142.

Meanwhile, the coolant flowing through the plurality of flow paths 112 may cool the battery pack P arranged on the cooling plate 100, and in order to improve the cooling efficiency, the cross-sections of the plurality of flow paths 112 may have not only circular shapes but also triangular or polygonal shapes.

Figure 5:
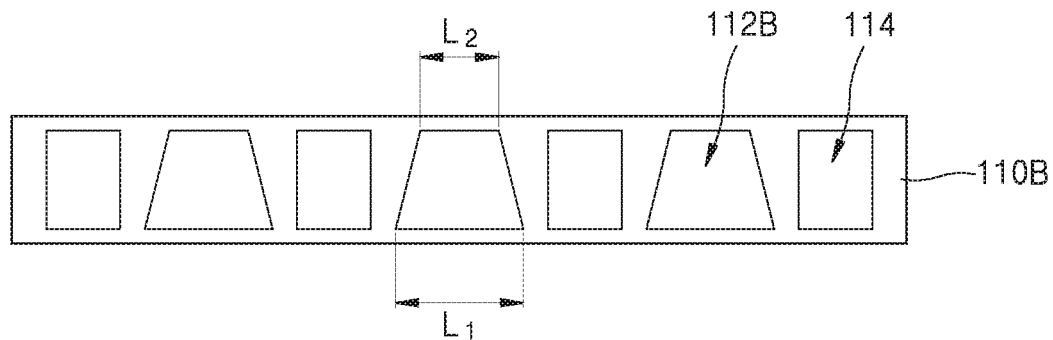
FIGS. 5 to 7 are cross-sectional views respectively illustrating examples of a III-III' cross section in FIG. 2.
Figure 6:
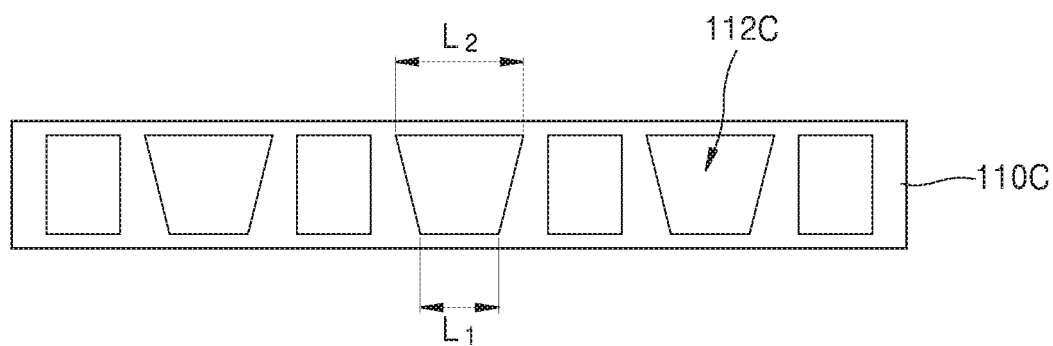
Figure 7:
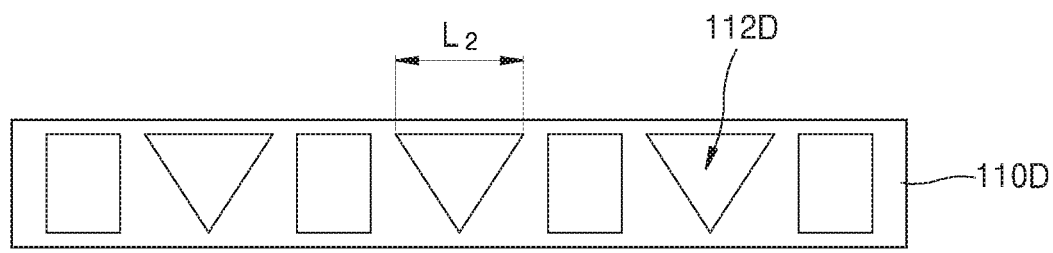

FIGS. 5 to 7 are cross-sectional views respectively illustrating examples of a III-III' cross-section in FIG. 2.

A housing 110B of FIG. 5 may include a hollow 114 and a flow path 112B, and the hollow 114 is the same as that described and illustrated in FIGS. 1 to 4 and thus will not described herein for conciseness. As illustrated in FIG. 5, the flow path 112B may have a cross-section in the shape of a tetragon. Particularly, the flow path 112B may have a cross-section in the shape of a trapezoid having a lower side and an upper side having different lengths. In this case, a length L1 of the lower side may be less than or equal to about three times a length L2 of the upper side. As described below, when the length L1 of the lower side is greater than about three times the length L2 of the upper side, the heat exchange through the bottom surface of the housing 110B may become more dominant than the cooling of the battery pack (P of FIG. 1) and thus the cooling efficiency of the battery pack (P of FIG. 1) may be reduced by the cooling plate (100 of FIG. 1).

A housing 110C of FIG. 6 may include a flow path 112C having a cross-section in the shape of an inverted trapezoid. The flow path 112C of FIG. 6 may maintain the same coolant flow rate as the flow path 112E of FIG. 5; however, because a length L2 of an upper side of the flow path 112C is greater than a length L1 of a lower side thereof, the cooling efficiency of the battery pack (P of FIG. 1) may be further improved. Also, because the length L1 of the lower side decreases, the heat exchange with the floor where the cooling plate (100 of FIG. 1) is placed may decrease and thus the battery pack (P of FIG. 1) may be efficiently cooled.

A housing 110D of FIG. 7 may include a flow path 112D having a cross-section in the shape of an inverted triangle. That is, because the bottom side of the triangle is formed to face upward, the heat exchange through the bottom surface of the housing 110D may be minimized and thus the cooling efficiency of the battery pack (P of FIG. 1) may be improved.

Figure 8:
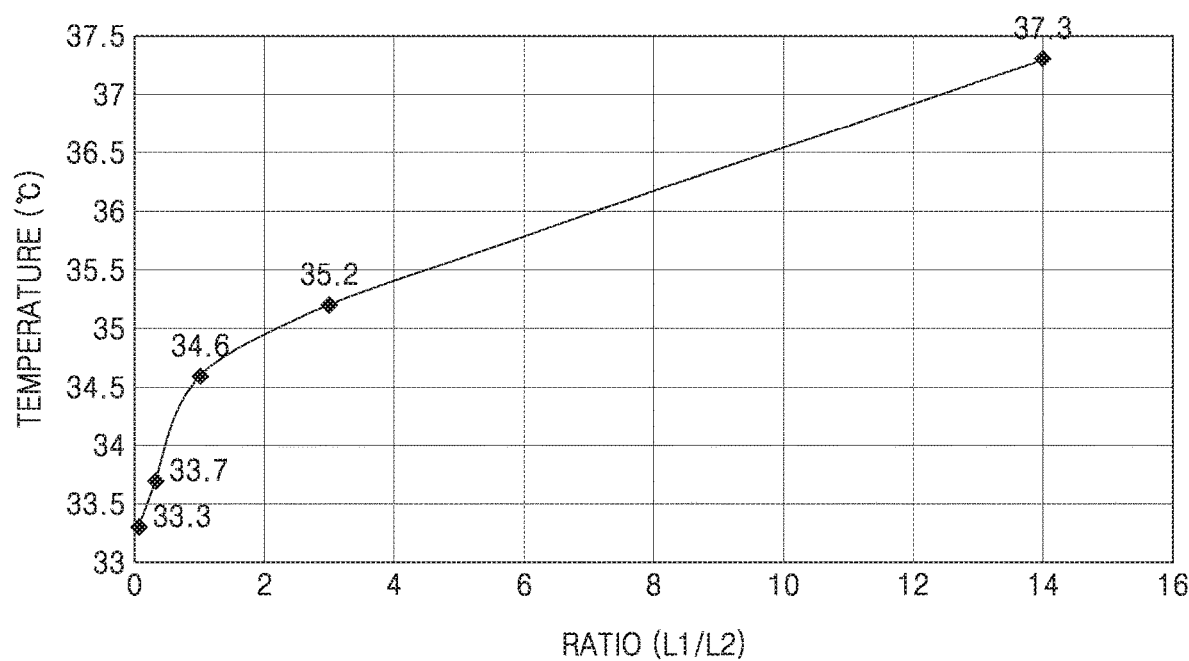
FIG. 8 is a graph illustrating a result of measuring an average temperature of a battery pack according to a flow path shape of the cooling plate of FIG. 1.

FIG. 8 is a graph illustrating a result of measuring an average temperature of a battery pack according to a flow path shape of the cooling plate of FIG. 1. Hereinafter, a description will be given with reference to FIG. 8 and FIG. 5 together.

FIG. 8 illustrates the result of measuring the average temperature of the battery pack (P of FIG. 1) according to the ratio (L1/L2) of the length (L1) of the lower side to the length (L2) of the upper side in the cross-sectional shape of the flow path 112B illustrated in FIG. 5. Here, the average temperature may mean the average value of the minimum temperature measured at the bottom of the battery pack (P of FIG. 1) and the maximum temperature measured at the top surface of the battery pack (P of FIG. 1).

As illustrated in FIG. 8, when the ratio L1/L2 of the length (L1) of the lower side of the flow path 112B to the length (L2) of the upper side is greater than about 3, the average temperature of the battery pack (P of FIG. 1) may be higher than about 35° C. When the average temperature of the battery pack (P of FIG. 1) is higher than about 35° C., the performance of the battery pack (P of FIG. 1) may be degraded by heat generation, and therefore, when the cross-section of the flow path 112B is tetragonal, the length (L1) of the lower side should be less than or equal to about three times the length (L2) of the upper side.

Meanwhile, as the ratio (L1/L2) of the length (L1) of the lower side to the length (L2) of the upper side decreases, the average temperature of the battery pack (P of FIG. 1) may decrease. Particularly, as the ratio (L1/L2) of the length (L1) of the lower side to the length (L2) of the upper side decreases to about 1 or less, the average temperature of the battery pack (P of FIG. 1) may decrease rapidly. Thus, when the cross-section of the flow path 112B is tetragonal, the ratio (L1/L2) of the length (L1) of the lower side to the length (L2) of the upper side may be about 1 or less. As such, when the length (L1) of the lower side is less than or equal to the length (L2) of the upper side, the heat exchange of the coolant with the outside through the bottom surface of the cooling plate (100 of FIG. 1) may be reduced and thus the heat exchange with the battery pack (P of FIG. 1) may be performed more effectively.

Particularly, when the ratio (L1/L2) of the length (L1) of the lower side to the length (L2) of the upper side is close to 0, that is, when the length (L1) of the lower side converges to 0 and thus it has the same shape as the flow path 112D illustrated in FIG. 7, the cooling efficiency of the cooling plate (100 of FIG. 1) may be maximized.

Although the present disclosure has been described with reference to the embodiments illustrated in the drawings, this is merely an example and those of ordinary skill in the art will understand that various modifications and other equivalent embodiments may be derived therefrom. Thus, the spirit and scope of the present disclosure should be defined by the technical spirit of the appended claims.

The invention claimed is:

1. A battery module comprising:
a cooling plate comprising a housing, a first manifold coupled to one end of the housing, and a second manifold coupled to another end of the housing; and
at least one battery pack arranged on the cooling plate,
wherein the housing comprises therein a plurality of flow paths passing through the housing from the one end to the other end and a plurality of hollows passing through the housing from the one end to the other end, and
wherein the plurality of flow paths and the plurality of hollows are arranged alternately and in parallel to each other, the plurality of hollows being sealed at at least one end to block fluid flow therethrough.

2. The battery module of claim 1, wherein
the cooling plate further comprises a first spacer arranged between the one end and the first manifold and a second spacer arranged between the other end and the second manifold, the first and second spacers sealing the plurality of hollows.

3. The battery module of claim 1, wherein
the first manifold has a shape of a cuboid and comprises a first guide protruding inward from at least one of two main side surfaces with a wider area among side surfaces of the cuboid.

4. The battery module of claim 3, wherein
the first manifold comprises a coolant inlet on one side thereof, and
a height of the first guide decreases away from the coolant inlet.

5. The battery module of claim 4, wherein
the second manifold has a shape of a cuboid and comprises a second guide protruding inward from at least one of two main side surfaces with a wider area among side surfaces of the cuboid.

6. The battery module of claim 5, wherein
the second manifold further comprises a coolant outlet at a diagonal position with respect to the coolant inlet, and
a height of the second guide increases away from the coolant outlet.

7. The battery module of claim 1, wherein
a cross-section of each of the plurality of flow paths has a shape of a tetragon, and
a length of a lower side of the tetragon is less than or equal to about three times a length of an upper side of the tetragon adjacent to the battery pack.

8. The battery module of claim 7, wherein
the length of the lower side is less than or equal to the length of the upper side.

9. The battery module of claim 1, wherein
a cross-section of each of the plurality of flow paths has a shape of an inverted triangle with a bottom side adjacent to the battery pack.

10. A battery module comprising:
a cooling plate comprising a housing, a first manifold coupled to one end of the housing, and a second manifold coupled to another end of the housing; and
at least one battery pack arranged on the cooling plate, wherein:
the housing comprises therein a plurality of flow paths passing through the housing from the one end to the other end and a plurality of hollows,
the plurality of flow paths and the plurality of hollows are arranged alternately and in parallel to each other,
the cooling plate further comprises a spacer arranged between the one end and the first manifold, the spacer sealing the plurality of hollows,
the spacer comprises a plate arranged on the one end and a plurality of blocks protruding from the plate, and
the plurality of blocks are inserted into the plurality of hollows to seal the plurality of hollows.

11. The battery module of claim 10, wherein
the plate comprises a plurality of first holes at positions corresponding to the plurality of flow paths.

12. The battery module of claim 11, wherein
the first manifold comprises a coolant inlet on one side thereof, and
a size of the plurality of first holes decreases toward the coolant inlet.

13. The battery module of claim 10, wherein
each of the plurality of blocks comprises an empty space therein, and
the plate further comprises a second hole connected to the empty space.

14. The battery module of claim 10, wherein
the first manifold overlaps with an edge of one end portion of the housing, and the first manifold and the edge of the one end portion of the housing overlapping with each other are joined together.

15. The battery module of claim 14, wherein
the first manifold comprises a stopper protruding vertically from an inner surface thereof in an inward direction of the first manifold, and
the stopper contacts an edge of the plate.

16. The battery module of claim 10, wherein the cooling plate further comprises another spacer arranged between the other end and the second manifold, the another spacer comprising a plate arranged on the other end and a plurality of blocks protruding from the plate.

* * * * *